A. C. KLENKE.
TOY VEHICLE.
APPLICATION FILED AUG. 25, 1919.
1,345,092.
Patented June 29, 1920.
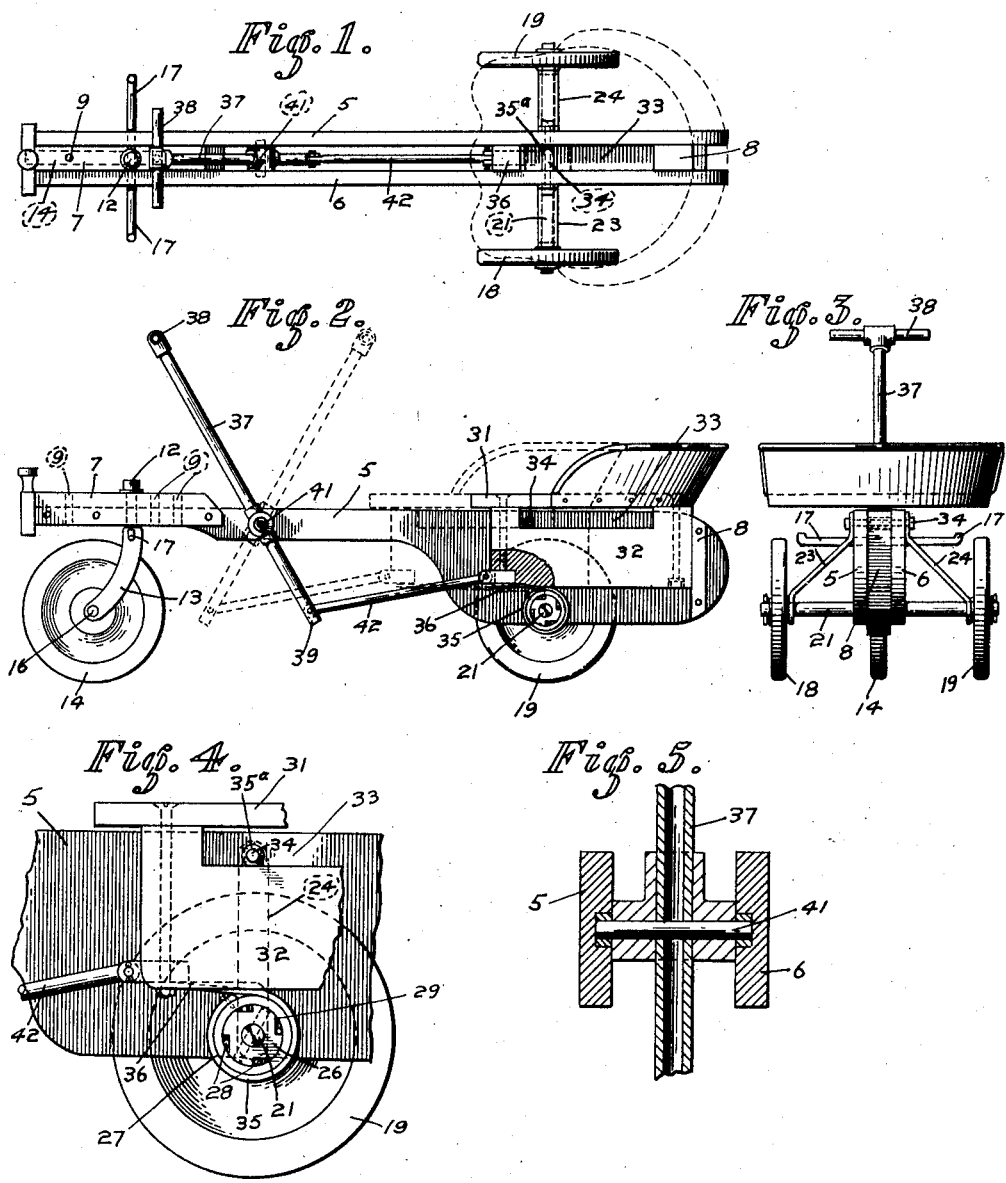
INVENTOR
AUGUST C. KLENKE
BY
Bradley L. Benson
ATTORNEY

UNITED STATES PATENT OFFICE.

AUGUST C. KLENKE, OF BERKELEY, CALIFORNIA.

TOY VEHICLE.

1,345,092.  Specification of Letters Patent.  Patented June 29, 1920.

Application filed August 25, 1919. Serial No. 319,841.

*To all whom it may concern:*

Be it known that I, AUGUST C. KLENKE, a citizen of the United States, residing at Berkeley, in the county of Alameda and State of California, have invented certain new and useful Improvements in Toy Vehicles, of which the following is a specification.

This invention relates to an improvement in a child's vehicle of the type propelled by the rider.

The principal object of this invention is to produce a vehicle for a child which may be propelled over the ground through the muscular effort of the child proper applied to the driving wheel.

Another object is to produce a vehicle wherein the muscular effort necessary to propel the same is such as to promote health.

Another object of this invention is to produce a vehicle which when a downward incline is encountered the vehicle will coast, and also to provide means for adjusting the vehicle to suit the requirements of children of different ages. Simplicity is also an important factor of this invention.

In this specification and the annexed drawings, the invention is illustrated in the form considered to be the best, but it is to be understood that the invention is not limited to such form, because it may be embodied in other forms, and it is also to be understood that in and by the claims following the description it is desired to cover the invention in whatever form it may be embodied.

In the drawings:—

Figure 1 is a top plan view of my complete coaster.

Fig. 2 is a side elevation partly in cross section, and with one of the side members removed for the purpose of better illustrating the workings of the same.

Fig. 3 is a rear plan view of Fig. 2.

Fig. 4 is a detail view of the drive mechanism.

Fig. 5 is a detail view of the operating lever journal.

In the drawings, like numerals refer to corresponding parts in the several views.

The numerals 5 and 6 refer to side members of a vehicle frame preferably of the shape shown and placed parallel to one another. At 7 I have shown a spacer member suitably secured between the forward ends of the parallel members 5 and 6, and at 8 a spacer member suitably attached and spacing the rear ends of said parallel members. The member 7 is provided with vertical openings 9 any one of which may be used to accommodate the king bolt 12 which carries at its lower end a fork 13, which fork supports a caster wheel 14 suitably journaled upon a shaft 16. A foot rest is formed, as at 17, for guiding the vehicle. The rear wheels 18 and 19 are mounted upon a shaft 21 extending through bushings suitably secured in the side members 5 and 6. One of these wheels, such as 18, is suitably keyed to the shaft 21. It is obvious that both wheels may be keyed to the shaft. This shaft is of sufficient length to extend for an appreciable distance upon both outer sides of the side members 5 and 6 for the purpose of providing a suitable tread. The outer ends of this shaft are braced by bent metal members 23 and 24, which prevent any bending of said shaft.

At 26 I have shown a clutch member keyed to the shaft 21, and provided on its periphery with flat portions 29. This clutch member is located between the side members 5 and 6, and is surrounded by a tubular member 27 between which and the flat portions of the clutch I place rollers 28.

At 31 I have shown a sliding seat member provided on its under side with a depending portion 32. This depending portion is so formed as to provide a slot 33 when attached to the seat 31 through which a bolt 34 having engagement with the side members 5 and 6 passes. This bolt is provided at its central portion with a roller 35ª, the purpose of which is to reduce wear upon the depending portion of the seat when the same is brought in contact with the bolt 34.

At 35 I have shown a flexible member, which may be formed of leather, fabric, or the like, and having one end attached at the forward end of the depending portion, as at 36, and having its opposite end partially encircling the periphery of the tubular member 29, and suitably attached thereto.

At 37 I have shown a pivoted hand lever having handles 38 and a bifurcated end 39. This hand lever is pivoted at the point 41 upon a pivot passing through and secured in the side members 5 and 6. The bifurcated end 9 is connected through the medium of a link 42 to the forward end of the depending portions of the seat, the result being that as the hand lever 37 is reciprocated, the seat 31 will also be reciprocated upon the side members 5 and 6. The amount of movement is limited by the location of the bolt 34. This arrangement of parts will cause the depending portion of the seat to be in a plane directly above the clutch as a whole and the flexible member will lie between the same.

The operation of this vehicle is as follows:—When a child desires to propel himself or herself over the ground, the feet are placed upon the foot rests 17, and the child sits upon the seat 31, grasping the handles 38 to reciprocate the same. The weight of the child will cause the depending member 32 to press upon the flexible member 35, which in turn will press upon the tubular member 29, and as the same is freely movable on the clutch member 26, rearward movement of the seat 32 will cause the tubular member to rotate rearwardly or clockwise until the lever is at its forward position. If the handles 38 are now drawn rearwardly, the seat will move forwardly and will cause the flexible member to be unwound from the drum, which unwinding will rotate the shaft through the operation of the clutch, and the wheel 18 which is keyed to the shaft 21 will rotate and cause the vehicle to move forwardly.

It is obvious that after a stroke has been made the vehicle will progress a distance equal to its momentum, owing to the clutch arrangement. Each additional stroke will contribute to the forward movement of the vehicle. It will be noted that the construction of this vehicle is such that as the seat moves forward, the arms and hands move rearwardly. This is of particular interest in that this movement expands the chest thereby strengthening the lungs and associated organs.

It is perfectly obvious that a fractional stroke will serve to propel the vehicle in a forward direction the same as a full stroke, the only difference being that the vehicle will only travel a distance which will be in proportion to the frictional stroke with relation to the full stroke.

Having thus described my invention what I claim as new and desire to secure by Letters Patent of the United States is as follows:—

1. In a device of the character described, the combination of a frame consisting of parallel spaced members, a steering wheel pivotally secured beneath the forward ends of said parallel members, a shaft journaled near the rear end of said parallel members, wheels mounted upon said shaft, a clutch member mounted on said shaft at a point between said parallel members, a tubular member surrounding said clutch member, roller means interposed between said tubular member and said clutch member, a sliding seat supported on said parallel members, said seat having a depending portion, a hand lever pivoted at a point between said parallel members and in advance of said sliding seat, a link connecting the lower end of said hand lever and said depending portion of said seat, and a flexible member underlying said depending portion and having its forward end attached to said depending portion, and having its free end partially encircling and secured to said tubular member.

2. In a device of the character described, the combination of a frame comprising parallel spaced members, a steering wheel pivotally mounted near the forward end of said frame, a shaft suitably journaled in said parallel members and projecting beyond the sides of said parallel members, wheels mounted on the said projecting shaft and suitably secured thereto, a seat carried upon said parallel members, said seat having a depending portion, a clutch mounted on said shaft at a point between said parallel members, a flexible member surrounding said clutch and attached to the depending portion of said seat, and means for reciprocating said seat and its depending portion.

3. In a child's vehicle, the combination of a frame comprising parallel spaced members, a seat slidable thereon, a shaft mounted transversely of said parallel members and journaled thereon, at a point beneath said seat, wheels mounted on said shaft and keyed thereto, a clutch mounted on said shaft at a point between said parallel members, a flexible member surrounding said clutch, a depending portion attached to said seat, said depending portion bearing on said flexible member, and having one end of said flexible member attached thereto, and means for reciprocating said seat.

In testimony whereof I affix my signature.

AUGUST C. KLENKE.